US010149192B2

(12) United States Patent
Seo et al.

(10) Patent No.: US 10,149,192 B2
(45) Date of Patent: Dec. 4, 2018

(54) VEHICLE TERMINAL AND METHOD FOR CONTROLLING DATA TRANSMISSION QUANTITY OF THE VEHICLE TERMINAL

(71) Applicant: HYUNDAI MOTOR COMPANY, Seoul (KR)

(72) Inventors: Jae Am Seo, Seongnam-si (KR); Dong Youl Lee, Seoul (KR); Chul Min Kim, Yongin-si (KR); Young Su Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 142 days.

(21) Appl. No.: 15/153,330

(22) Filed: May 12, 2016

(65) Prior Publication Data

US 2017/0118670 A1    Apr. 27, 2017

(30) Foreign Application Priority Data

Oct. 21, 2015 (KR) ........................ 10-2015-0146883

(51) Int. Cl.
*H04W 28/02* (2009.01)
*H04W 28/04* (2009.01)
*H04L 1/00* (2006.01)
*H04W 84/00* (2009.01)
*H04L 29/08* (2006.01)

(52) U.S. Cl.
CPC ........... *H04W 28/0231* (2013.01); *H04L 1/00* (2013.01); *H04W 28/04* (2013.01); *H04W 84/005* (2013.01); *H04L 67/12* (2013.01)

(58) Field of Classification Search
CPC .. H04L 1/0029; H04L 67/12; H04W 28/0231; H04W 28/04; H04W 28/06; G07C 5/008
See application file for complete search history.

(56) References Cited

U.S. PATENT DOCUMENTS

2015/0081202 A1*  3/2015  Levin ................... G08G 1/162
                                                                  701/400
2017/0208128 A1*  7/2017  Stenneth ................ H04L 67/12

FOREIGN PATENT DOCUMENTS

| JP | 2007-184874 A | 7/2007 |
| JP | 2010-033346 A | 2/2010 |
| KR | 10-0394640 B1 | 8/2003 |
| KR | 10-2009-0113468 A | 11/2009 |

(Continued)

*Primary Examiner* — Pao Sinkantarakorn
(74) *Attorney, Agent, or Firm* — McDermott Will & Emery LLP

(57) ABSTRACT

A vehicle terminal includes a data collector for collecting driving information of a vehicle, a first communicator for performing wireless communication with other vehicle terminals, a second communicator for performing wireless communication with roadside terminals positioned at roadsides, and a controller for generating corresponding vehicle transmission data using the driving information, wherein the controller compares other vehicle transmission data provided from the other vehicle terminals and the corresponding vehicle transmission data with each other and transmits identification information assigned to the corresponding vehicle transmission data through the second communicator when an error between the other vehicle transmission data and the corresponding vehicle transmission data is within an allowable error range.

11 Claims, 7 Drawing Sheets

(56) References Cited

FOREIGN PATENT DOCUMENTS

| KR | 10-1103343 B1 | 1/2012 |
| KR | 10-2012-0057208 A | 6/2012 |
| KR | 10-2014-0084877 A | 7/2014 |

\* cited by examiner

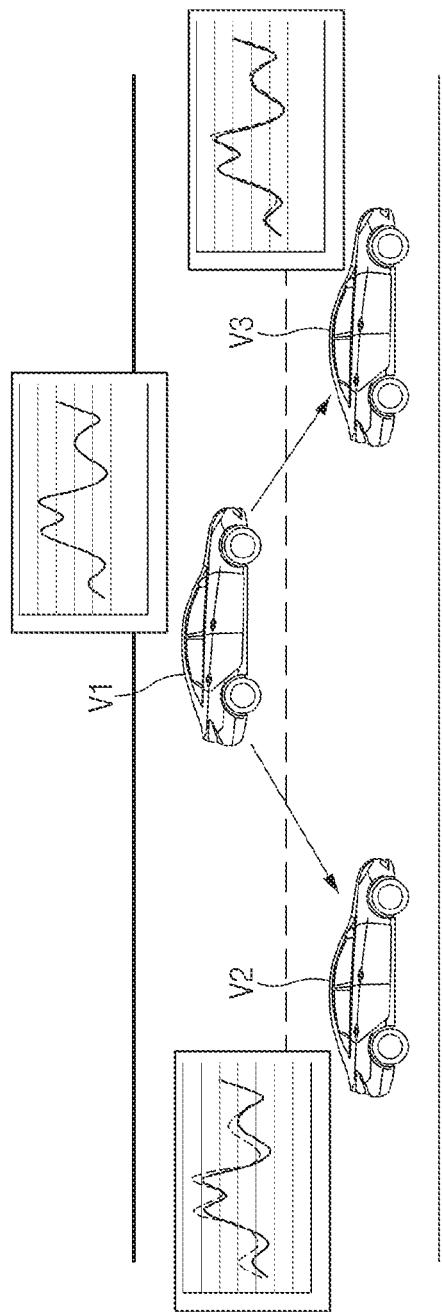

VEHICLE TERMINAL AND METHOD FOR CONTROLLING DATA TRANSMISSION QUANTITY OF THE VEHICLE TERMINAL

CROSS-REFERENCE TO RELATED APPLICATION

This application claims the benefit of priority to Korean Patent Application No. 10-2015-0146883, filed on Oct. 21, 2015 with the Korean Intellectual Property Office, the disclosure of which is incorporated herein in its entirety by reference.

TECHNICAL FIELD

The present disclosure relates to a vehicle terminal capable of sharing data to be transmitted to a traffic information center between vehicles and capable of controlling a data transmission quantity to be transmitted on the basis of the shared data, and a method for controlling a data transmission quantity of the vehicle terminal.

BACKGROUND

An intelligent transportation system (ITS) is a transportation system allowing components of an existing transportation system such as roads, vehicles, signal systems, and the like, to organically act together by applying technologies such as an electronic technology, a control technology, a communication technology, and the like, to the components in order to efficiently adjust traffic congestion and significantly increase stability. The intelligent transportation system collects information on the vehicles and analyzes and processes the collected information to provide traffic information to users.

In the intelligent transportation system, the respective vehicles transmit driving information (traffic information) collected by the respective vehicles to roadside apparatuses, and transmit driving information received by the roadside apparatuses to a traffic information center.

However, since the vehicle peripherally performs group driving when being driven, collected environment information (data) around the vehicle is significantly similar to that of the surrounding vehicles.

For example, in the case in which the vehicle is driven on a road having a small number of branches such as an expressway, the probability that the vehicle will perform group driving together with the surrounding vehicles is increased. That is, the probability that information collected by the vehicle and information collected by the surrounding vehicles will be similar to each other is increased.

However, in the intelligent transportation system according to the related art, since the vehicles collect the driving information, respectively, and transmit the driving information to a server of the traffic information center through the roadside apparatuses, respectively, similar information contains overlapping data and is collected in the server. As described above, since the vehicles transmit the data collected by each of them, an overload is applied to the server due to the increase in traffic (a data transmission quantity), which may cause a malfunction.

In addition, in the related art, since the vehicles transmit individually collected information to the server, data is sent inefficiently.

SUMMARY

The present disclosure has been made to solve the above-mentioned problems occurring in the prior art while advantages achieved by the prior art are maintained intact.

An aspect of the present disclosure provides a vehicle terminal capable of sharing data to be transmitted to a traffic information center between vehicles and controlling a data transmission quantity to be transmitted on the basis of the shared data, and a method for controlling a data transmission quantity thereof.

According to an exemplary embodiment of the present disclosure, a vehicle terminal may include: a data collector for collecting driving information of a vehicle; a first communicator for performing wireless communication with other vehicle terminals; a second communicator for performing wireless communication with roadside terminals positioned at roadsides; and a controller for generating corresponding vehicle transmission data using the driving information, wherein the controller compares other vehicle transmission data provided from the other vehicle terminals and the corresponding vehicle transmission data with each other and transmits identification information assigned to the corresponding vehicle transmission data through the second communicator when an error between the other vehicle transmission data and the corresponding vehicle transmission data is within an allowable error range.

The first communicator may use vehicle to vehicle (V2V) communication.

The second communicator may use vehicle to infrastructure (V2I) communication.

The controller may broadcast the corresponding vehicle transmission data through the first communicator when a data transmission condition is satisfied.

The controller may use other vehicle transmission data having a smaller error from the corresponding vehicle transmission data when two or more other vehicle transmission data are received.

The allowable error range may be adjusted depending on a data budget of the vehicle terminal.

According to another exemplary embodiment of the present disclosure, a method for controlling a data transmission quantity of a vehicle terminal may include: generating corresponding vehicle transmission data by collecting driving information of a corresponding vehicle; receiving other vehicle transmission data transmitted from other vehicle terminals through a first wireless communication after the generating of the corresponding vehicle transmission data; comparing the corresponding vehicle transmission data with the other vehicle transmission data with each other; confirming whether or not an error between the other vehicle transmission data and the corresponding vehicle transmission data is within an allowable error range; and transmitting identification information assigned to the corresponding vehicle transmission data to a server through a second communicator when the error is in the allowable error range.

The first wireless communication may be V2V communication.

The second wireless communication may be V2I communication.

The method for controlling a data transmission quantity of a vehicle terminal may further include, after the step of generating the corresponding vehicle transmission data: broadcasting the corresponding vehicle transmission data to the other vehicle terminals through the first wireless communication; and transmitting the corresponding vehicle transmission data to the server through the second wireless communication.

The allowable error range may be adjusted depending on a data budget of each vehicle terminal.

In the step of confirming of whether or not the error between the other vehicle transmission data and the corresponding vehicle transmission data is within the allowable error range, the corresponding vehicle transmission data may be transmitted to the server when the error between the other vehicle transmission data and the corresponding vehicle transmission data is outside of the allowable error range.

BRIEF DESCRIPTION OF THE DRAWINGS

The above and other objects, features and advantages of the present disclosure will be more apparent from the following detailed description taken in conjunction with the accompanying drawings.

FIGS. 5A and 5B are views for describing processes for controlling a data transmission quantity of a vehicle terminal in the case in which vehicle terminals are present in the same vehicle to vehicle communication network according to an embodiment of the present disclosure.

DETAILED DESCRIPTION

Hereinafter, exemplary embodiments of the present disclosure will be described in detail with reference to the accompanying drawings.

The present disclosure pertains to decreasing traffic transmitted through a vehicle to infrastructure (V2I) communication network by allowing the respective vehicles to transmit and receive data to be transmitted through V2I communication therebetween using vehicle to vehicle (V2V) communication and compare their data and the received data with each other to control a data transmission quantity to be transmitted through the V2I communication.

Figure 1:
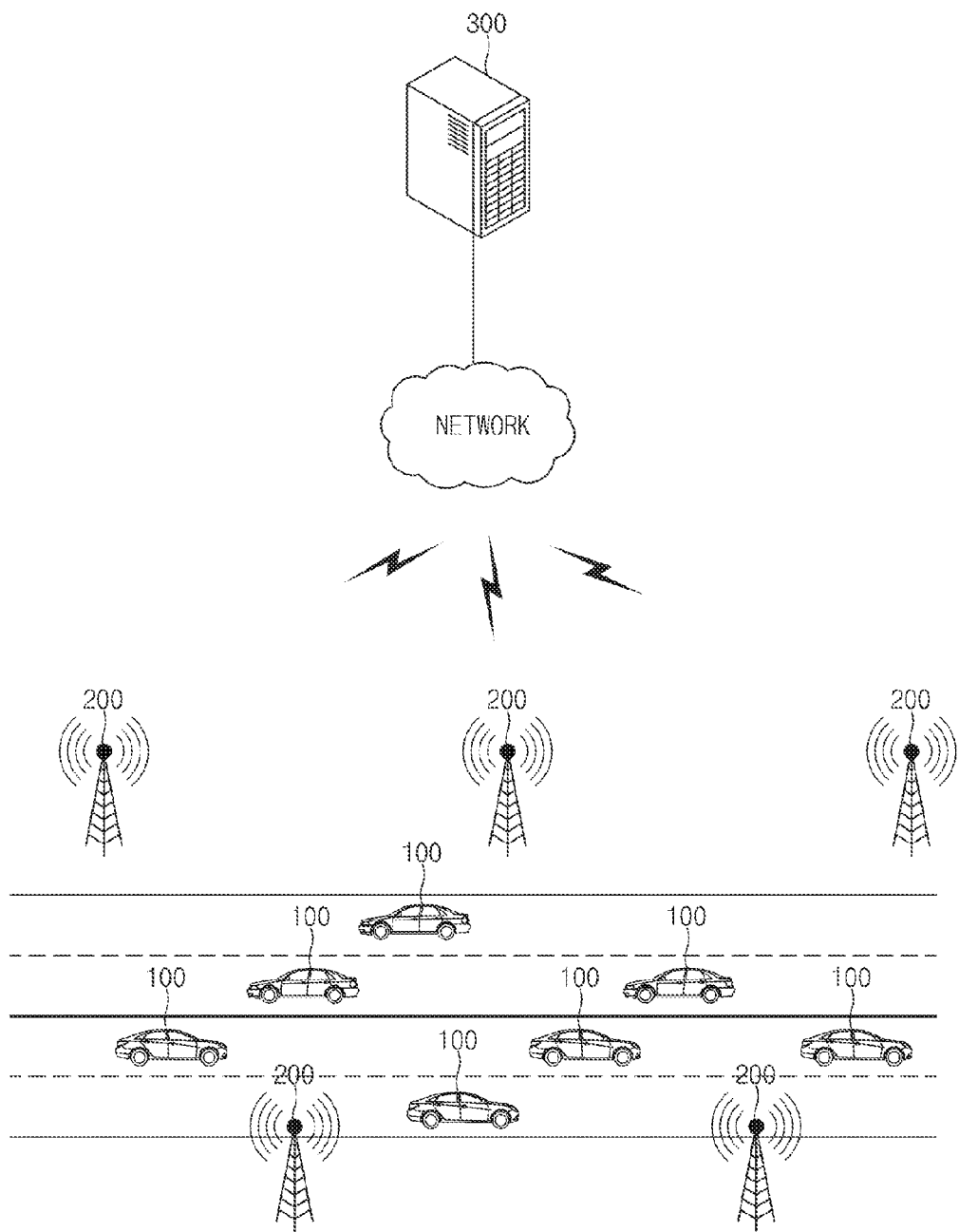
FIG. 1 is a block diagram of a vehicle driving information management system related to the present disclosure.

FIG. 1 is a block diagram of a vehicle driving information management system related to the present disclosure.

As illustrated in FIG. 1, the vehicle driving information management system may include vehicle terminals 100, roadside terminals 200 and a server 300.

The vehicle terminals 100 may collect driving information of corresponding vehicles and transmit the collected driving information to other vehicle terminals 100 and/or the roadside terminals 200.

The roadside terminals 200 may be installed at roadsides, receive driving information transmitted from the vehicle terminals 100, and transfer the received driving information to the server 300. In addition, the roadside terminals 200 may collect road information using various sensors (a camera, a speed sensor, and the like) and transmit the collected road information to the server 300.

The server 300 may perform wired communication or wireless communication with the roadside terminals 200. Internet, a local area network (LAN), a wide area network (WAN), or the like, may be used as a wired communication technology, and wireless Internet, mobile communication, near field communication, or the like, may be used as a wireless communication technology.

The server 300 may receive the driving information and the road information transmitted from the roadside terminals 200, and store and manage the driving information and the road information in a database (not illustrated). In addition, the server 300 may analyze and process the driving information of the vehicles and the road information, and provide the processed driving information and road information to users.

Figure 2:
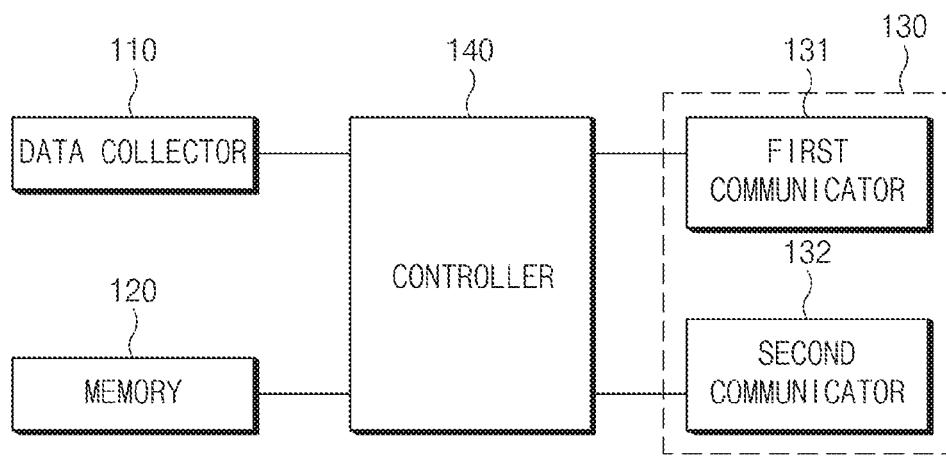
FIG. 2 is a block diagram of a vehicle terminal according to an exemplary embodiment of the present disclosure.

FIG. 2 is a block diagram of the vehicle terminal illustrated in FIG. 1.

As illustrated in FIG. 2, the vehicle terminal 100 may include a data collector 110, a memory 120, a communicator 130 and a controller 140.

The data collector 110 may collect driving information of a vehicle using various sensors provided in the vehicle. Here, the sensors may include a speed sensor, a temperature sensor, an image sensor, a global positioning system (GPS) module, a distance sensor, a steering angle sensor and the like. In addition, the driving information may include a vehicle speed, an external temperature, road information, position information, accident information and the like.

Data generated depending on an operation of the vehicle terminal 100, data (information) collected through the data collector 110, and the like, may be stored in the memory 120. The memory 120 may include a buffer storing the driving information collected by the data collector 110 therein.

The communicator 130 may include a first communicator 131 and a second communicator 132 using a vehicle communication network. The first communicator 131 and the second communicator 132 may use a first wireless communication and a second wireless communication, which may be different from each other, respectively.

The first communicator 131 may perform wireless communication with the other vehicle terminals through a V2V communication network.

The second communicator 132 may perform data communication with the roadside terminal 200 using a V2I communication network.

The controller 140 may generate corresponding vehicle transmission data (data packet) having a packet form using the driving information collected through the data collector 110 when a data transmission condition is satisfied. The data transmission condition may be a passage of a predetermined time, a buffer full state, or the like.

For example, the controller 140 may generate the data packet using the driving information stored in the buffer when the buffer is full.

The corresponding vehicle transmission data (data packet) may include driving information and identification information, an origination address, a destination address and the like. Here, the identification information may be a unique identification (ID) assigned to the data packet.

The controller 140 may broadcast the generated corresponding vehicle transmission data to one or more other vehicle terminals through the first communicator 131. In addition, the controller 140 may transmit the generated corresponding vehicle transmission data through the second communicator 132. Here, the corresponding vehicle transmission data may be transferred to the server 300 through the roadside terminal 200.

Meanwhile, the controller 140 may generate the corresponding vehicle transmission data, and then receive other vehicle transmission data (including driving information, identification information, and the like) transmitted from the other vehicle terminals through the first communicator 131. The controller 140 may compare the other vehicle transmission data and the corresponding vehicle transmission data with each other to confirm whether or not an error between the other vehicle transmission data and the corresponding vehicle transmission data is within an allowable error range present in a collection policy.

Here, the allowable error range may be adjusted depending on a data budget of each vehicle terminal 100. In the case in which the data budget is large, when the allowable error range is narrowed, the probability that more accurate corresponding vehicle transmission data (corresponding vehicle data) will be transmitted may be increased. Meanwhile, in the case in which the data budget is small, when the allowable error range is widened, accuracy may be decreased, but the use probability of the other vehicle transmission data (other vehicle data) may be increased.

The controller 140 may transmit the identification information of the corresponding vehicle transmission data through the second communicator 132 when the error between the other vehicle transmission data and the corresponding vehicle transmission data is in the allowable error range. In this case, the controller 140 may also transmit the identification information of the corresponding vehicle transmission data after the controller 140 waits for a preset time.

In other words, the controller 140 may transmit the generated corresponding vehicle transmission data except for driving information of the corresponding vehicle similar to the driving information included in the other vehicle transmission data provided from other vehicle terminals.

Meanwhile, the controller 140 may transmit the generated corresponding vehicle transmission data using the driving information and the identification information when the error between the other vehicle transmission data and the corresponding vehicle transmission data is out of the allowable error range. In other words, the controller 140 may transmit the generated corresponding vehicle transmission data to the roadside terminal 200 using the second communicator 132. In addition, the roadside terminal 200 may transmit the corresponding vehicle transmission data provided from the vehicle terminal 100 to the server 300 using wired communication or wireless communication.

The controller 140 may selectively use the other vehicle transmission data having a smaller error from the corresponding vehicle transmission data when the other vehicle transmission data is received from two or more other vehicle terminals.

When times of the data transmitted from the vehicle terminal 100 are misaligned with each other, the server 300 may maintain information of the packet data previously received from the vehicle terminal 100 and synthesize the data received from the other vehicle terminals as the next data.

For example, when the previous data received from the vehicle terminal is data from a first second to a tenth second and the next received data are data from a fifteenth second to a twenty fifth second, the server 300 may combine data from an eleventh second to a twentieth second received from the other vehicle terminals with the previous data of the vehicle terminal.

Figure 3:
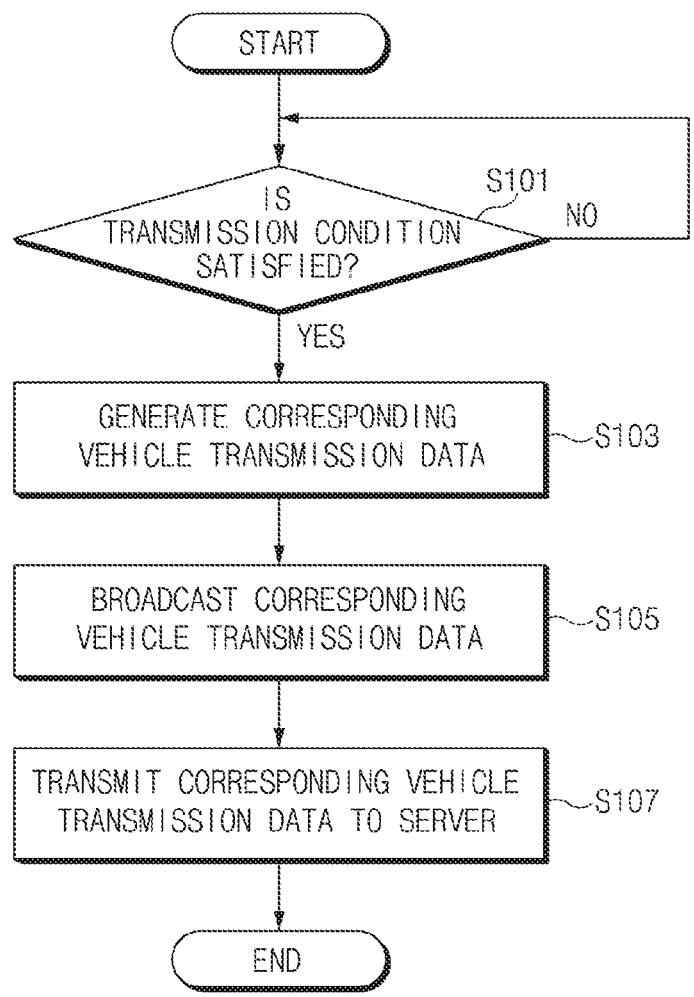
FIG. 3 is a flow chart illustrating a method for controlling a data transmission quantity of a vehicle terminal according to an exemplary embodiment of the present disclosure.

FIG. 3 is a flow chart illustrating a method for controlling a data transmission quantity of a vehicle terminal according to an embodiment of the present disclosure.

As illustrated in FIG. 3, the vehicle terminal 100 may confirm whether or not the data transmission condition is satisfied (S101).

The vehicle terminal 100 may generate the corresponding vehicle transmission data (data packet) using the driving information of the corresponding vehicle collected through the data collector 110 (S103) when the data transmission condition is satisfied. The corresponding vehicle transmission data (data packet) may include driving information and identification information, an origination address, a destination address and the like. Here, the identification information may be a unique identification (ID) assigned to the data packet.

The vehicle terminal 100 may broadcast the generated corresponding vehicle transmission data to the other vehicle terminals using the V2V communication (first wireless communication (S105) after the vehicle terminal 100 generates the corresponding vehicle transmission data.

The vehicle terminal 100 may transmit the generated corresponding vehicle transmission data to the server 300 through the V2I communication (second wireless communication) (S107).

According to the embodiment described above, the vehicle terminal 100 may transmit the corresponding vehicle transmission data to the other vehicle terminals positioned in the surrounding using the V2V communication before the vehicle terminal 100 transmits the corresponding vehicle transmission data to the server 300 through the V2I communication.

Figure 4:
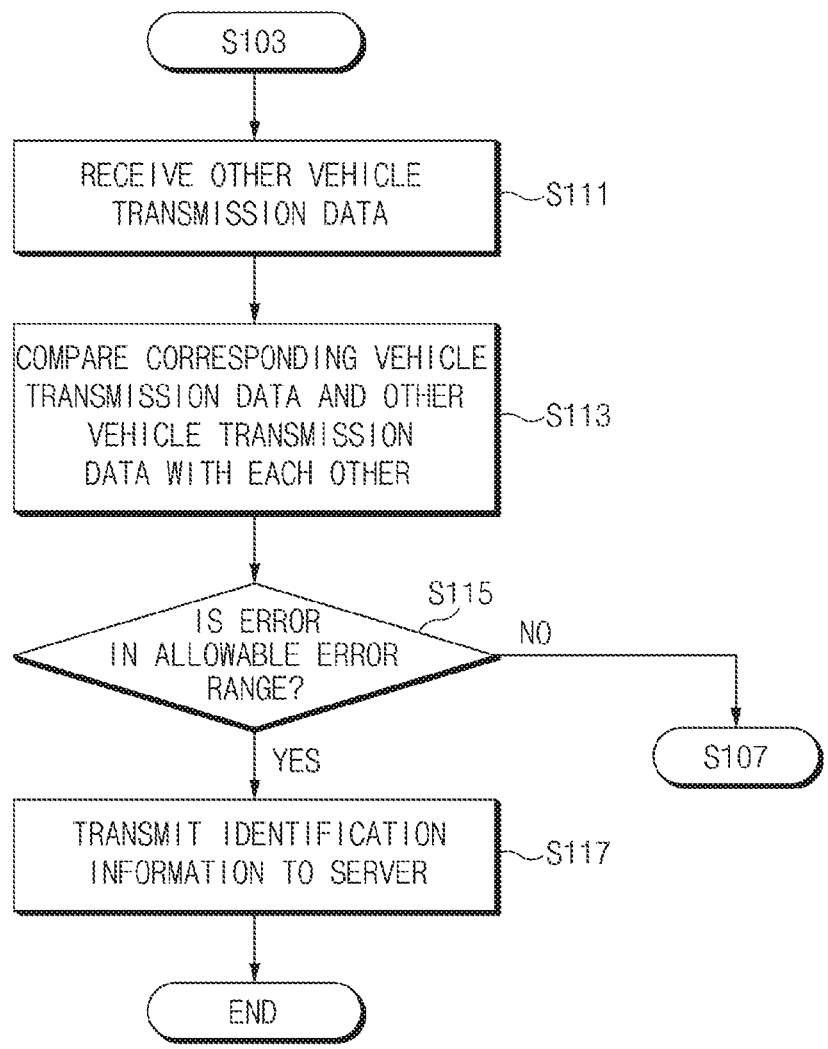
FIG. 4 is a flow chart illustrating a method for controlling a data transmission quantity of a vehicle terminal according to an exemplary embodiment of the present disclosure.

FIG. 4 is a flow chart illustrating a method for controlling a data transmission quantity of a vehicle terminal according to another embodiment of the present disclosure. In the present embodiment, a case in which the vehicle terminal 100 receives other vehicle transmission data from other vehicle terminals in a state in which it generates corresponding vehicle transmission data to be transmitted will be described by way of example.

The vehicle terminal 100 may receive the other vehicle transmission data transmitted from the other vehicle terminals (S111). The vehicle terminal 100 may generate the corresponding vehicle transmission data using the driving information of the corresponding vehicle collected through the data collector 110 as in S103 of FIG. 3, and then receive the other vehicle transmission data transmitted by the other vehicle terminals.

The vehicle terminal 100 may compare the corresponding vehicle transmission data and the other vehicle transmission data with each other (S113), when the vehicle terminal 100 receives the other vehicle transmission data. The vehicle terminal 100 may generate the corresponding vehicle transmission data (data packet) using the collected driving information of the corresponding vehicle.

The vehicle terminal 100 may confirm whether or not the error between the corresponding vehicle transmission data and the other vehicle transmission data is within the allowable error range (S115). That is, the vehicle terminal 100 may confirm whether or not the corresponding vehicle transmission data and the other vehicle transmission data are similar to each other.

When the error between the corresponding vehicle transmission data and the other vehicle transmission data is in the allowable error range, the vehicle terminal 100 may transmit the identification information of the corresponding vehicle transmission data to the server 300 through the V2I communication (S117). Here, the identification information may be a unique ID assigned to the corresponding vehicle transmission data, and the identification information of the corresponding vehicle transmission data may be transferred to the server 300 through the roadside terminal 200.

Meanwhile, when the error between the corresponding vehicle transmission data and the other vehicle transmission data is out of the allowable error range in S115, the vehicle terminal 100 may perform S107 of FIG. 3.

As described above, the vehicle terminal 100 according to the present disclosure may transmit the corresponding vehicle transmission data to the surrounding vehicle terminals and the server 300 when the corresponding vehicle transmission data and the other vehicle transmission data are different from each other, and may transmit only the identification information assigned to the corresponding vehicle transmission data to the server 300 when the corresponding vehicle transmission data and the other vehicle transmission data are similar to each other.

Figure 5B:
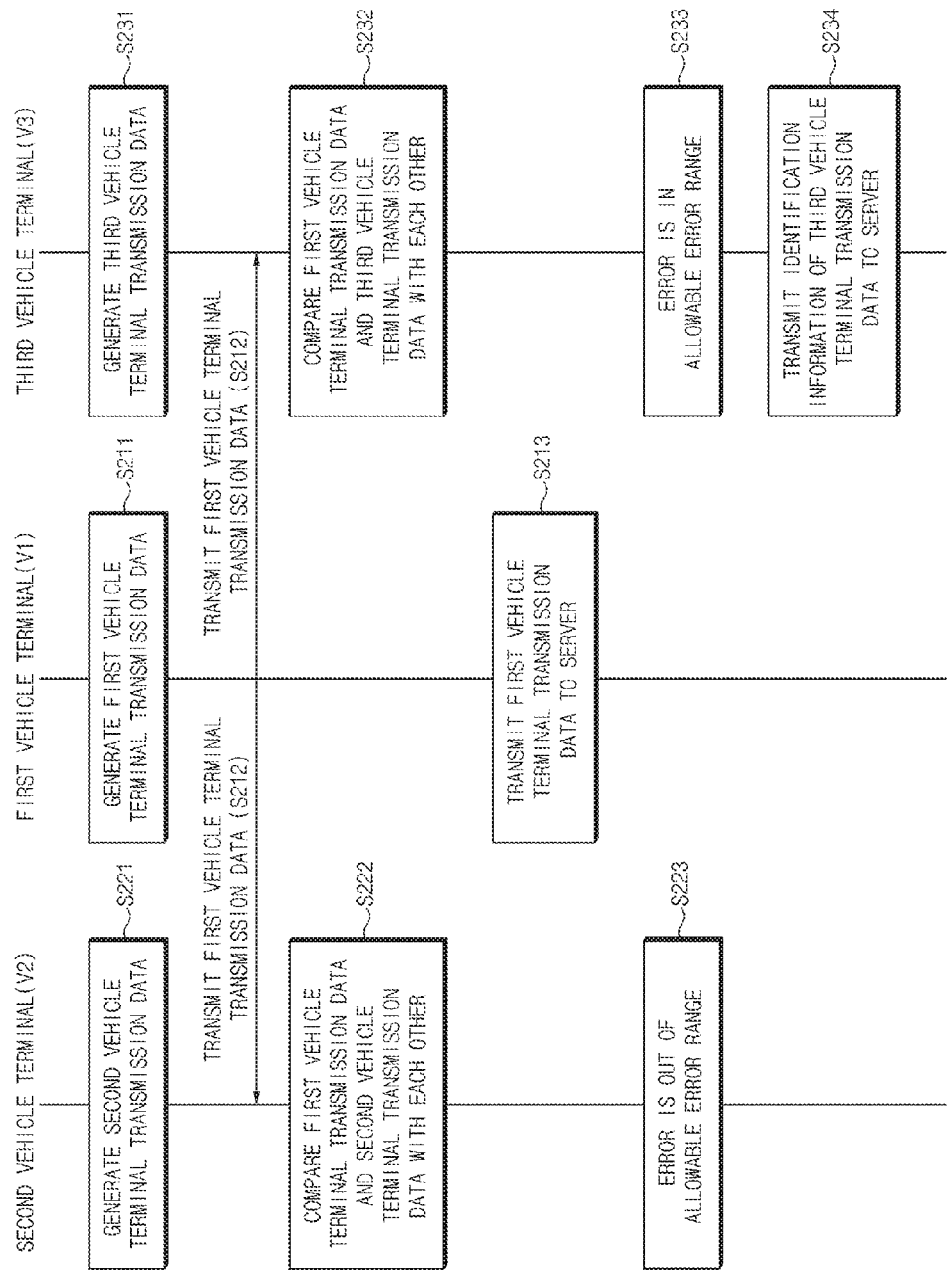

FIGS. 5A and 5B are views for describing processes for controlling a data transmission quantity of a vehicle terminal in a case in which vehicle terminals are present in the same vehicle to vehicle communication network according to embodiments the present disclosure.

As illustrated in FIGS. 5A and 5B, a first vehicle terminal V1, a second vehicle terminal V2 and a third vehicle terminal V3 may be positioned in the same V2V communication network.

The first vehicle terminal V1, the second vehicle terminal V2, and the third vehicle terminal V3 may collect driving information of corresponding vehicles, respectively, to generate transmission data (S211, S221 and S231).

The first vehicle terminal V1 may transmit first vehicle transmission data to the second vehicle terminal V2 and the third vehicle terminal V3 through the V2V communication (S212).

The first vehicle terminal V1 may transmit the first vehicle transmission data to the server 300 through the V2I communication (S213).

When the second vehicle terminal V2 receives the first vehicle transmission data, the second vehicle terminal V2 may compare the first vehicle transmission data and second vehicle transmission data with each other (S222).

When an error between the first vehicle transmission data and the second vehicle transmission data is outside of an allowable error range (S223), the second vehicle terminal V2 may not transmit the second vehicle transmission data, but may return to S221 to generate second vehicle transmission data.

When the third vehicle terminal V3 receives the first vehicle transmission data, the third vehicle terminal V3 may compare the first vehicle transmission data and third vehicle transmission data with each other (S232). When an error between the first vehicle transmission data and the third vehicle transmission data is within an allowable error range, the third vehicle terminal V3 may transmit identification data of the third vehicle transmission data to the server 300 (S233 and S234).

The server 300 may generate a record using the driving information and the identification information received from the first vehicle terminal V1, and generate a record using the identification information received from the third vehicle terminal V3. In addition, the server 300 may complete a record for the second vehicle terminal V2 using the driving information received from the first vehicle terminal V1.

Figure 6:
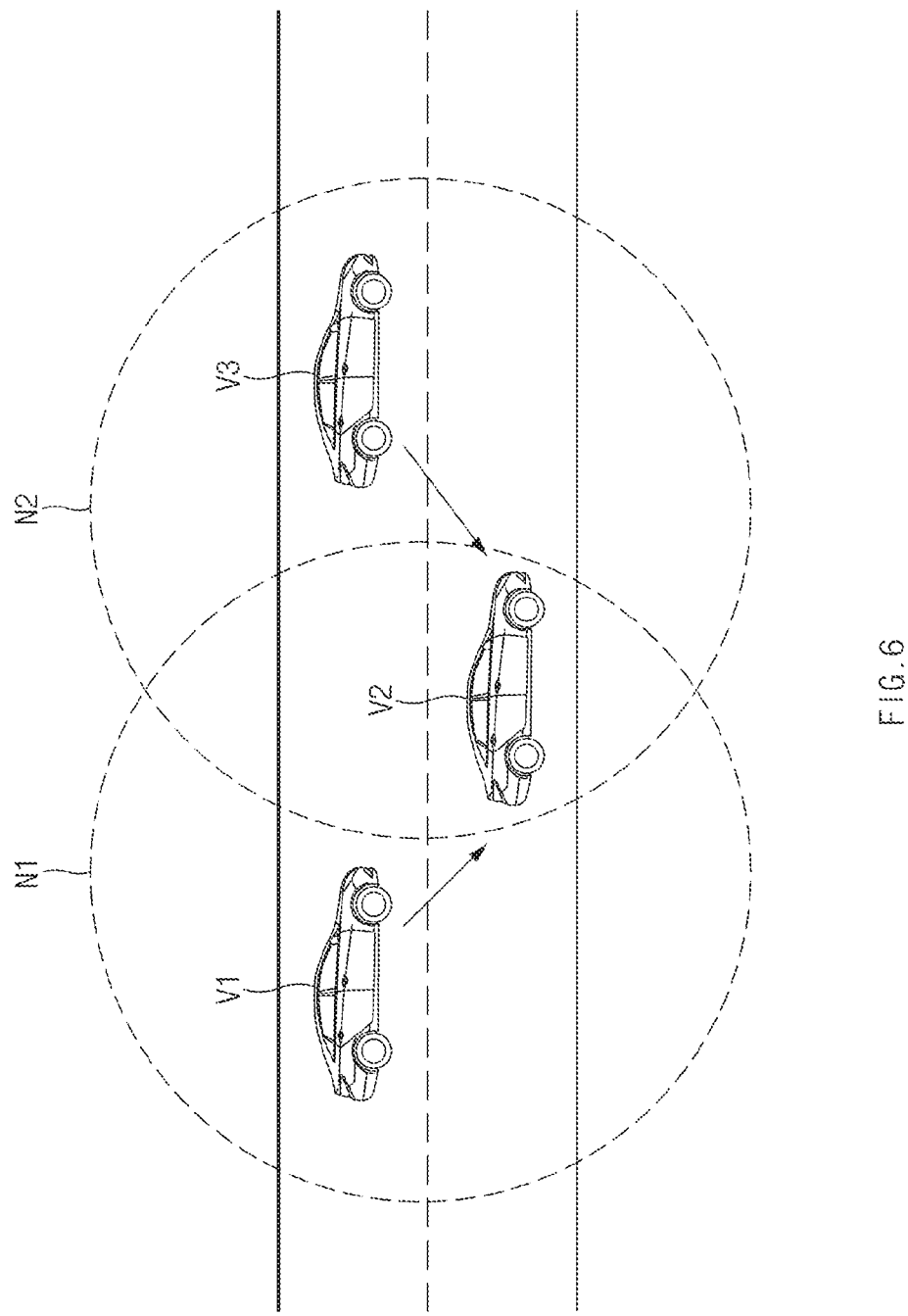
FIG. 6 is a view for describing a method for controlling a data transmission quantity of a vehicle terminal positioned in an overlapped region between two vehicle to vehicle communication networks according to an embodiment of the present disclosure.

FIG. 6 is a view for describing a method for controlling a data transmission quantity of a vehicle terminal positioned in an overlapped region between two vehicle to vehicle communication networks according to an embodiment of the present disclosure.

As illustrated in FIG. 6, the first vehicle terminal V1 and the second vehicle terminal V2 may be positioned in a first vehicle to vehicle communication network N1, and the second vehicle terminal V2 and the third vehicle terminal V3 may be positioned in a second vehicle to vehicle communication network N2.

In the case in which the second vehicle terminal V2 is positioned in an overlapped region between the first vehicle to vehicle communication network N1 and the second vehicle to vehicle communication network N2, the second vehicle terminal V2 may receive transmission data broadcasted from the first vehicle terminal V1 and the third vehicle terminal V3.

The second vehicle terminal V2 may compare the transmission data provided from the first vehicle terminal V1 and transmission data of a corresponding vehicle with each other to calculate an error. In addition, the second vehicle terminal V2 may compare the transmission data transmitted from the third vehicle terminal V3 and transmission data of the corresponding vehicle with each other to calculate an error.

The second vehicle terminal V2 may select transmission data having a smaller comparison error from the transmission data of the second vehicle terminal V2, of the transmission data of the first vehicle terminal V1 and of the transmission data of the third vehicle terminal V3. In this case, the second vehicle terminal V2 may transmit identification information of the transmission data having the smaller comparison error from the transmission data of the corresponding vehicle to the server 300.

As described above, according to an embodiment of the present disclosure, the vehicles share data collected in order to be transmitted to a traffic information center with each other, and compare the shared data with the collected data of the corresponding vehicles with each other to control a data transmission quantity transmitted to the traffic information center, thereby making it possible to decrease a data transmission amount transmitted through a wireless network.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A vehicle terminal comprising:
a data collector for collecting driving information of a vehicle;
a first communicator for performing wireless communication with other vehicle terminals;
a second communicator for performing wireless communication with roadside terminals positioned at roadsides; and
a controller for generating corresponding vehicle transmission data using the driving information,
wherein the controller compares other vehicle transmission data provided from the other vehicle terminals and the corresponding vehicle transmission data with each other, transmits identification information assigned to the corresponding vehicle transmission data through the second communicator when an error between the other vehicle transmission data and the corresponding vehicle transmission data is within an allowable error range, and transmits the corresponding vehicle transmission data to the server when the error between the other vehicle transmission data and the corresponding vehicle transmission data is outside of the allowable error range.

2. The vehicle terminal according to claim 1, wherein the first communicator uses a vehicle to vehicle (V2V) communication.

3. The vehicle terminal according to claim 2, wherein the second communicator uses a vehicle to infrastructure (V2I) communication.

4. The vehicle terminal according to claim 1, wherein the controller broadcasts the corresponding vehicle transmission data through the first communicator when a data transmission condition is satisfied.

5. The vehicle terminal according to claim 1, wherein the controller uses other vehicle transmission data having a smaller error from the corresponding vehicle transmission data when two or more other vehicle transmission data are received.

6. The vehicle terminal according to claim 1, wherein the allowable error range is adjusted depending on a data budget of the vehicle terminal.

7. A method for controlling a data transmission quantity of a vehicle terminal, comprising:
   generating corresponding vehicle transmission data by collecting driving information of a corresponding vehicle;
   receiving other vehicle transmission data transmitted from other vehicle terminals through a first wireless communication after the step of generating of the corresponding vehicle transmission data;
   comparing the corresponding vehicle transmission data and the other vehicle transmission data with each other;
   confirming whether or not an error between the other vehicle transmission data and the corresponding vehicle transmission data is within an allowable error range; and
   transmitting identification information assigned to the corresponding vehicle transmission data to a server through a second communicator when the error is within the allowable error range,
   wherein in the step of confirming of whether or not the error between the other vehicle transmission data and the corresponding vehicle transmission data is in the allowable error range, the corresponding vehicle transmission data are transmitted to the server when the error between the other vehicle transmission data and the corresponding vehicle transmission data is outside of the allowable error range.

8. The method for controlling a data transmission quantity of a vehicle terminal according to claim 7, wherein the first wireless communication is V2V communication.

9. The method for controlling a data transmission quantity of a vehicle terminal according to claim 7, wherein the second wireless communication is V2I communication.

10. The method for controlling a data transmission quantity of a vehicle terminal according to claim 7, further comprising, after the step of generating the corresponding vehicle transmission data:
    broadcasting the corresponding vehicle transmission data to the other vehicle terminals through the first wireless communication; and
    transmitting the corresponding vehicle transmission data to the server through the second wireless communication.

11. The method for controlling a data transmission quantity of a vehicle terminal according to claim 7, wherein the allowable error range is adjusted depending on a data budget of each vehicle terminal.

* * * * *